US010031923B2

(12) United States Patent
Liu

(10) Patent No.: US 10,031,923 B2
(45) Date of Patent: Jul. 24, 2018

(54) DISPLAYING REGION-BASED SEARCH RESULTS

(71) Applicant: Alibaba Group Holding Limited, George Town (KY)

(72) Inventor: Zhimin Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 290 days.

(21) Appl. No.: 14/747,328

(22) Filed: Jun. 23, 2015

(65) Prior Publication Data
US 2016/0004725 A1 Jan. 7, 2016

(30) Foreign Application Priority Data

Jul. 4, 2014 (CN) .......................... 2014 1 0317295

(51) Int. Cl.
*G06F 17/30* (2006.01)
(52) U.S. Cl.
CPC .............................. *G06F 17/30241* (2013.01)
(58) Field of Classification Search
CPC ................................................ G06F 17/30241
USPC ......................................................... 707/724
See application file for complete search history.

(56) References Cited

U.S. PATENT DOCUMENTS

| 5,471,392 A * | 11/1995 | Yamashita | G01C 21/36 340/995.23 |
| 5,576,951 A | 11/1996 | Lockwood | |
| 5,802,492 A * | 9/1998 | DeLorme | G01C 21/3476 340/990 |
| 5,852,810 A | 12/1998 | Sotiroff et al. | |
| 5,893,093 A * | 4/1999 | Wills | G06F 17/3087 |
| 5,930,474 A * | 7/1999 | Dunworth | G06F 17/3087 707/999.01 |
| 5,938,721 A * | 8/1999 | Dussell | G01C 21/26 701/468 |

(Continued)

FOREIGN PATENT DOCUMENTS

| JP | H07160701 | 6/1995 |
| JP | 2002108876 | 4/2002 |

(Continued)

OTHER PUBLICATIONS

The Chinese Office Action dated Dec. 31, 2011 for Chinese patent application No. 200810135169.2, a counterpart foreign application of U.S. Appl. No. 12/664,863, 17 pages.

(Continued)

*Primary Examiner* — Kris E Mackes
*Assistant Examiner* — Tiffany Thuy T Bui
(74) *Attorney, Agent, or Firm* — Van Pelt, Yi & James LLP

(57) ABSTRACT

Providing search results includes: receiving a set of one or more search keywords; obtaining a plurality of search results that are generated in response to a search performed using the set of one or more search keywords, the plurality of search results each having corresponding region attribute information; establishing a set of one or more regions according to at least region attribute information of the plurality of search results; generating display information associated with the set of one or more regions, the display information comprising one or more of: textual information, graphic information, or geographical location information; and causing the display information to be displayed.

17 Claims, 6 Drawing Sheets

(56) References Cited

U.S. PATENT DOCUMENTS

| | | | | |
|---|---|---|---|---|
| 6,002,853 A | * | 12/1999 | de Hond | G06F 17/30873 |
| | | | | 707/E17.01 |
| 6,108,650 A | | 8/2000 | Musk et al. | |
| 6,202,023 B1 | * | 3/2001 | Hancock | G01C 21/20 |
| | | | | 701/516 |
| 6,240,425 B1 | * | 5/2001 | Naughton | G06F 17/3087 |
| | | | | 701/532 |
| 6,542,813 B1 | * | 4/2003 | Kovacs | G01C 21/3679 |
| | | | | 340/988 |
| 6,741,188 B1 | * | 5/2004 | Miller | G06Q 30/0255 |
| | | | | 340/539.13 |
| 7,173,632 B2 | | 2/2007 | Inokuchi | |
| 7,246,109 B1 | | 7/2007 | Ramaswamy | |
| 7,577,244 B2 | | 8/2009 | Taschereau | |
| 7,917,154 B2 | | 3/2011 | Fortescue | |
| 8,554,852 B2 | | 10/2013 | Burnim | |
| 2002/0049742 A1 | | 4/2002 | Chan | |
| 2002/0078035 A1 | | 6/2002 | Frank | |
| 2002/0156779 A1 | | 10/2002 | Elliott | |
| 2003/0061211 A1 | | 3/2003 | Shultz | |
| 2004/0064450 A1 | * | 4/2004 | Hatano | G06F 17/30241 |
| 2005/0091193 A1 | | 4/2005 | Frank | |
| 2005/0108213 A1 | | 5/2005 | Riise | |
| 2005/0227739 A1 | | 10/2005 | Dowling | |
| 2005/0262062 A1 | * | 11/2005 | Xia | G06F 17/30241 |
| 2006/0010108 A1 | | 1/2006 | Greenberg | |
| 2006/0106778 A1 | | 5/2006 | Baldwin | |
| 2006/0200490 A1 | | 9/2006 | Abbiss | |
| 2006/0206624 A1 | | 9/2006 | Wang | |
| 2006/0235816 A1 | | 10/2006 | Yang et al. | |
| 2007/0061363 A1 | | 3/2007 | Ramer | |
| 2007/0100867 A1 | | 5/2007 | Celik et al. | |
| 2007/0260741 A1 | | 11/2007 | Bezancon | |
| 2007/0288437 A1 | | 12/2007 | Xia | |
| 2008/0010273 A1 | | 1/2008 | Frank | |
| 2008/0097966 A1 | | 4/2008 | Choi | |
| 2008/0222119 A1 | | 9/2008 | Dai | |
| 2008/0243821 A1 | | 10/2008 | Delli Santi | |
| 2008/0256044 A1 | | 10/2008 | Anderson | |
| 2008/0281800 A1 | | 11/2008 | Bengtsson | |
| 2009/0037396 A1 | | 2/2009 | Uematsu | |
| 2009/0094212 A1 | | 4/2009 | Zaccagnino | |
| 2009/0119255 A1 | | 5/2009 | Frank | |
| 2009/0182729 A1 | | 7/2009 | Lu | |
| 2009/0209270 A1 | | 8/2009 | Gutierrez et al. | |
| 2009/0210416 A1 | | 8/2009 | Bennett | |
| 2010/0082242 A1 | * | 4/2010 | Park | G01C 21/00 |
| | | | | 701/532 |
| 2010/0138228 A1 | | 6/2010 | Abe et al. | |
| 2010/0185663 A1 | | 7/2010 | Lei et al. | |
| 2012/0102392 A1 | | 4/2012 | Reesman et al. | |
| 2014/0089336 A1 | | 3/2014 | Seefeld et al. | |
| 2014/0207795 A1 | * | 7/2014 | Zhou | G06F 17/30424 |
| | | | | 707/748 |

FOREIGN PATENT DOCUMENTS

| | | |
|---|---|---|
| JP | 2013205852 | 10/2013 |
| JP | 2014067409 | 4/2014 |
| WO | 03079229 | 9/2003 |
| WO | 2007046445 | 4/2007 |

OTHER PUBLICATIONS

The Extended European Search Report dated Nov. 9, 2011 for European patent application No. 09807309.1, 5 pages.

Translation of Japanese Office Action dated Sep. 3, 2013 for Japanese patent application No. 2011-523177, a counterpart foreign application of U.S. Appl. No. 12/664,863, 8 pages.

* cited by examiner

DISPLAYING REGION-BASED SEARCH RESULTS

CROSS REFERENCE TO OTHER APPLICATIONS

This application claims priority to People's Republic of China Patent Application No. 201410317295.5 entitled A SEARCH METHOD AND DEVICE AND A DISPLAY DEVICE, filed Jul. 4, 2014 which is incorporated herein by reference for all purposes.

BACKGROUND OF THE INVENTION

Search technology is becoming increasingly important to our daily lives. Typically, the user enters search keywords in a search box in an application, which sends the search keywords to a search engine to conduct a search. In some cases, the search engine uses the search keywords as a basis for sending back to the application combination keywords composed of the search keywords and supplemental keywords associated with the search keywords. The user chooses whether to use the combination keywords to conduct searches.

However, the existing search method is typically based only on search keywords and the display of supplemental keywords associated with the search keywords to users. It often does not take into account the regions associated with the search results and does not display search result-related regions to users. Thus, the search results may not be able to satisfy users' true intentions, e.g., a region-based search intention such as precise searches in search result distribution centers. Consequently, users need to conduct repeated searches using the application. This will increase data exchanges between the application and the search engine and thus add to the search engine's processing load.

BRIEF DESCRIPTION OF THE DRAWINGS

Various embodiments of the invention are disclosed in the following detailed description and the accompanying drawings.

In order to provide a clearer explanation of the technical schemes in embodiments of the present application, a simple introduction is given below to the drawings which are needed for the embodiments or the prior art. Obviously, the drawings described below are embodiments in the present application. Persons with ordinary skill in the art could, without expending creative effort, obtain other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
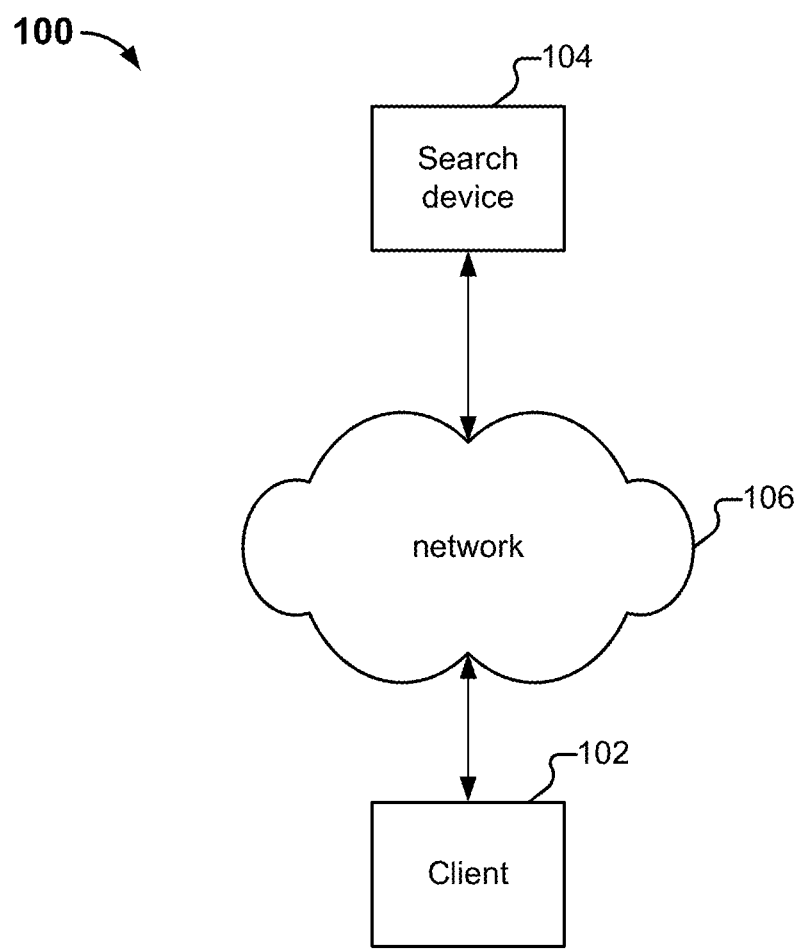
FIG. 1 is a block diagram illustrating an embodiment of a search environment.

FIG. 1 is a block diagram illustrating an embodiment of a search environment.

In system 100, a user uses an application executing on a client device (also referred to as a client terminal) such as 102 to send a search query to a search device such as 104 via a network 106 such as the Internet and obtain results from the search device.

In various embodiments, the client device can be a laptop computer, a desktop computer, a tablet, a mobile device, a smart phone, a wearable networking device, or any other appropriate computing device.

In various embodiments, the application can be an application program (e.g., a native application) or a browser-based application installed on the client device, configured to communicate with the search device.

In some embodiments, the search device includes a search engine operated by a service provider, an enterprise network, etc. The search engine can be implemented using techniques known to those skilled in the art. For example, the search engine may cooperate with other components (not shown) such as a search index and/or database to provide search results. In some embodiments, the search device further includes one or more additional processing components to perform additional processing on the search results of the search engine and provide location-based results. Details of the processing are described below.

In various embodiments, the search device can be implemented as a standalone device (e.g., a single server) or a distributed device (e.g., multiple servers or virtual machines operating on a plurality of processing cores communicating with each other and cooperating to provide the search results.)

Figure 2:
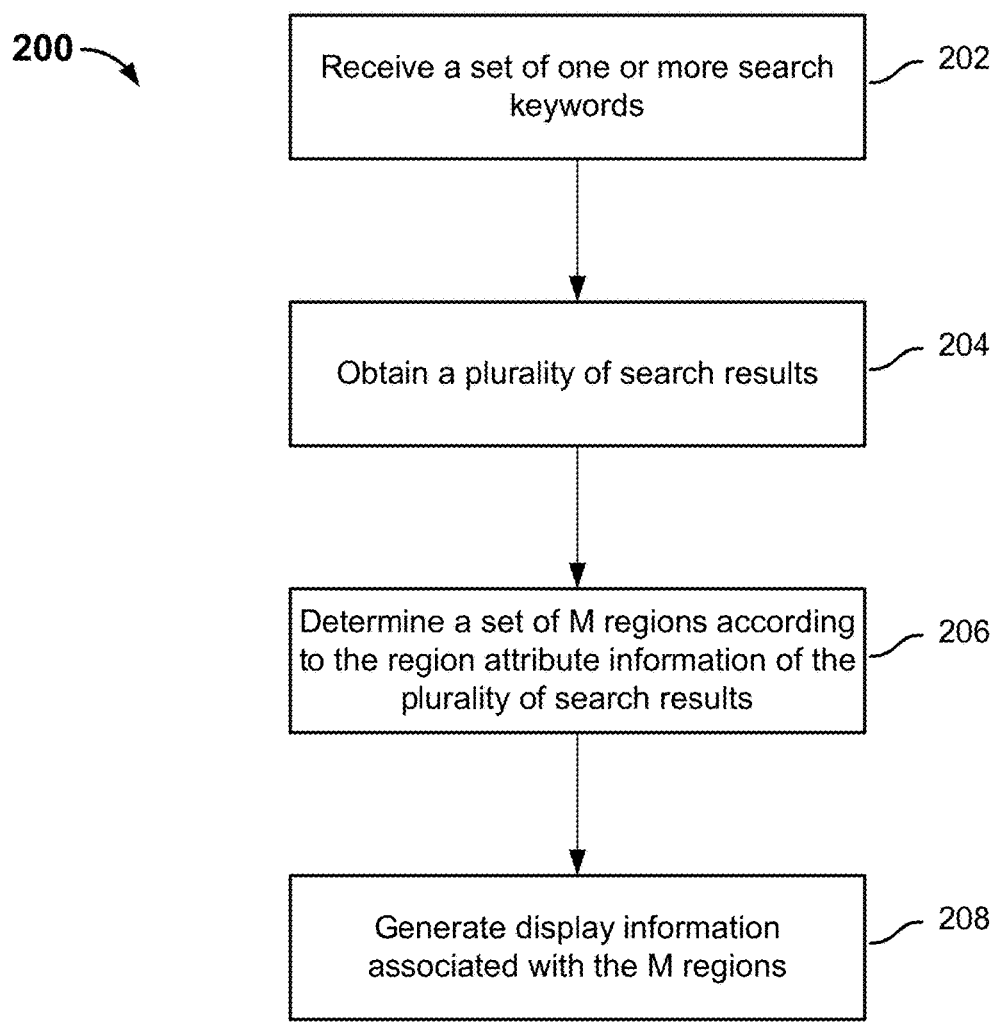
FIG. 2 is a flowchart illustrating an embodiment of a process for performing region-based searches.

FIG. 2 is a flowchart illustrating an embodiment of a process for performing region-based searches. Process 200 can be performed on a search device such as 104 of FIG. 1.

At 202, a set of one or more search keywords input by a user is received.

In one example, the search is conducted in the context of an electronic commerce platform, and the search results include information about goods or products available for sale on the platform. Multiple goods having the same attributes can be pre-defined as a commodity set, i.e., a standard product unit (SPU). As used herein, an SPU refers to a set of standardized information which is reusable and easy to search. This set of information describes features (e.g., attribute pairs) of a product. In some embodiments, an SPU includes reference information for one or more products. An SPU preferably refers to the smallest unit of aggregation of distinct product information for a set of products. In various embodiments, an SPU may be used to describe a group of similar products (e.g., products with similar features). In the process of creating, organizing, or managing merchandise information (e.g., for an internet website), a product's features can be described by multiple attribute pairs, and products with identical attribute pairs can be abstracted as being included in the same SPU. As used herein, a product refers to a "virtual" or "standard" product that shares at least some of the attributes with individual goods (which are specific types of the product). For example, in the context of this application, iPhone is referred to as a product, while iPhone 5 or iPhone 6 is referred to as goods. On certain large scale e-commerce platforms such as Alibaba.com or Taobao.com, billions or more goods are available for sale. To facilitate search of the goods, the goods are grouped according to SPUs. For example, a user may search for phones by specifying screen size larger than 5.0 inches, operating system of IOS, RAM storage of 2G, etc., and these attributes are looked up among a database storing SPUs to quickly locate specific goods that match these attributes.

In some embodiments, the search device acquires in real time the search keywords input by a user in a search box. In other words, while the search keywords are entered by the user into a search box, the search device can acquire the search keywords at substantially the same time the search keywords are entered. In some embodiments, the search device uses asynchronous loading technology such as Ajax async loading or Jsonp async loading to acquire the search keywords in real time and thus to execute process 200. In various embodiments, the search device can provide an Ajax interface or a Jsonp interface code. For example, it can use a language such as Java or Hypertext Preprocessor (PHP) for compiling script code, and use Jquery to invoke the compiled code. As another example, a language such as primitive JavaScript can be used.

In some embodiments, the search device is configured to receive search instructions including the search keywords input by a user in a search box. Specifically, the user enters the search keywords in the search box. Then the user clicks a button such as the "Search" button, which triggers a search instruction to be sent to the search device (e.g., via a hypertext transfer protocol (HTTP) message). The search instruction includes the search keywords. The search device extracts the search keywords from the search instruction.

At 204, a plurality of search results is obtained. In some embodiments, the search results are generated by a search engine in response to a search performed using the set of one or more search keywords. In some embodiments, the plurality of search results is obtained by using the search keywords as indices and matching the search keywords with a database of indexed items.

A variety of search algorithms known to those skilled in the art can be used to generate the search results. In various embodiments, the search device can conduct the search directly and obtain the search results, or request a separate search engine to conduct the search and obtain the search results from the search engine.

In some embodiments, all the items in the database being searched have predetermined region attribute information. Thus, the search results are associated with items having certain values such as goods or services, and each search result has corresponding region attribute information indicating the geographical region associated with the search result. For example, the region attribute information can correspond to the regions where the items are concentrated, which will mostly be places of origin for these goods or services (also referred to as primary source markets). A specialized market is a distribution center for a primary source of goods. For example, there are primary source distribution centers for children's apparel. That is, the children's apparel industrial zones generally may include Zhili Children's Apparel, Nantong Children's Apparel, and Qingdao Children's Apparel located in the cities of Zhili, Nantong, and Qingdao, respectively, as well as other similar specialized markets. As used herein, an industrial zone typically has multiple sellers within the same region. A search result such as a piece of children's apparel has corresponding region attribute information including information pertaining to one of the primary source distribution centers. By obtaining the region attribute information of search results, the system can use the region attribute information of the search results to quickly and accurately locate the requested items in these specialized markets and thus increase search efficiency and reliability.

At 206, a set of M regions is determined according to the region attribute information of the plurality of search results. M is an integer greater than or equal to 1, and its value depends on the computation below.

Optionally, in some embodiments, N regions associated with the plurality of search results are determined according to the region attribute information of each of the plurality of search results, N being an integer greater than or equal to M. The N regions are ranked (e.g., in the order of large-to-small) according to the number of search results under each of the N regions. Next, the ranking results of the ranking are evaluated according to the location of the search device and the location of each of the N regions to select the M regions.

Thus, by comparing the location of the terminal where the search device is located and the location of each of the N regions, it becomes possible to quickly and accurately locate the needed items in regions where a large volume of search results is aggregated. As a result, acquisition time for search results is greatly reduced, and thus search results are acquired more efficiently.

For example, the search device determines that there are N=10 distinct regions (e.g., region 1, region 2, region 3, region 4, region 5, region 6, region 7, region 8, region 9, and region 10) according to the region attribute information of 1,000 search results. The number of search results under region 1 is 40; the number of search results under region 2 is 40; the number of search results under region 3 is 450; the number of search results under region 4 is 10; the number of search results under region 5 is 200; the number of search results under region 6 is 20; the number of search results under region 7 is 10; the number of search results under region 8 is 150; the number of search results under region 9 is 30; the number of search results under region 10 is 50. The search device ranks these 10 regions from large-to-small order according to the search result quantity under each of the 10 regions. That is, the ranking results are: region 3, region 5, region 8, region 10, region 1, region 2, region 9, region 6, region 4, and region 7. For regions with the same search result quantity, any appropriate technique can be applied to break the tie, such as ranking the regions according to alphabetical order, etc.

Next, the search device can use the location of the search device and the location of each of the 10 regions to compute the distance between the terminal and each region. It uses the distances obtained thereby to adjust the ranking results and select the first M regions with the shortest distances. There are many ways to adjust the ranking results for the rankings. For example, weights corresponding to the obtained distances are determined empirically or through known machine learning processes. The obtained distances are multiplied with the corresponding weights, and the regions are sorted according to the weighted results to give a new ranked list, such as region 5, region 3, region 8, region 10, region 2, region 1, region 9, region 7, region 6, and region 4. Or, to give another example, it is possible to delete regions corresponding to distances exceeding a preset distance threshold value so as to obtain those regions that ultimately need to be retained, such as region 3, region 5, region 8, region 10, region 1, region 2, and region 9. Many other implementations are possible to select the first M regions that satisfy the region-based search intention of the user.

Optionally, in some embodiments, the M regions are determined according to the region attribute information of each of the search results and the category attribute information of each of the search results. The category attribute information indicates the category to which a search result belongs. For example, the search result pertaining to a particular pair of shorts may have the category attribute information of "children's apparel," and the search result pertaining to a particular brand of mobile phone may have the category attribute information of "electronics." Category attribute information can be used to expand the search result when the original search query does not have a region-based match.

Optionally, in some embodiments, the search categories associated with the search keywords are determined according to the category attribute information for each of the plurality of search results, and P regions associated with the plurality of search results are determined according to the region attribute information of each of the plurality of search results, P being an integer greater than or equal to M.

Furthermore, the search device can also rank the P regions (e.g., in a large-to-small order) according to the number of search results under each of the P regions. In the subsequent steps, the P regions are ranked.

The determination of the search categories associated with the search keywords according to the category attribute information of each of the plurality of search results may be executed at a later time. It needs only to be executed before the information comprising the search categories associated with the search keywords is used.

In some embodiments, the search keywords are matched among the names of each of the P regions so as to obtain Q regions, Q being an integer greater than or equal to 0. For example, if the search keyword is consistent with a region name (e.g., is included in the region name), then the region is included as one of the Q regions. If not, then this region is omitted and is no longer included as one of the Q regions. Lastly, the Q regions are sequentially ranked according to matching order (e.g., in a large-to-small order according to the number of search results in each region).

In some embodiments, the search keywords are further used to conduct matching among the business categories of each of the P regions so as to obtain R regions, R being an integer greater than or equal to 0. For example, if the search keyword is consistent with (e.g., included in) a region's business category, then the region is included as one of the R regions. If not, then this region is omitted and is no longer included as one of the R regions. Lastly, the R regions are sequentially ranked according to matching order (e.g., in a large-to-small order according to the number of search results in each region).

In some embodiments, the search categories associated with the search keywords are further used to conduct matching among the business categories of each of the P regions so as to obtain S regions, S being an integer greater than or equal to 0. For example, if the search category associated with the search keywords is consistent with a regional business category, then the region will be included as one of S regions. As used herein, a region business category refers to a region where the sellers sell products belonging to the same category. It is determined empirically in some cases. Specifically, if the search category associated with the search keyword is included within a regional business category (e.g., the search keyword-associated search category "children's cotton clothing" is included within the regional business category "children's apparel"), then it is included as one of the S regions. Next, if the keyword-associated search category includes a regional business category (e.g., the search keyword-associated search category "children's apparel" includes the regional business category "children's cotton clothing"), then the region is included as one of the S regions. Otherwise, this region is omitted and is no longer included as one of the S regions. Lastly, the S regions are sequentially ranked according to matching order.

Next, the search device can then sequentially rank the Q regions, the R regions, and the S regions according to the order in which they were obtained. That is, the Q regions are ranked to occupy the top positions in a list; the R regions are ranked to occupy the next positions in the middle of the list; and the S regions are ranked to occupy the last positions of the list.

Lastly, the search device can then adjust the ranking results of the ranking according to the location of the terminal on which the search device is located, the location of each of the Q regions, the location of each of the R regions, and the location of each of the S regions so as to select the first M regions.

In some embodiments, the terminal IP address serves as a basis for obtaining the terminal location. Various other existing positioning technologies may be used to obtain terminal positioning results. Examples include positioning technologies such as Global Positioning System (GPS) technology, Wireless Fidelity (WiFi) positioning technology, base station positioning technology, location-based service (LBS) technology, or combinations thereof.

For example, the search device may determine the search categories associated with search keywords according to the category attribute information of each of 1,000 search results. For example, the search category associated with the search keyword "Apple" is Mobile Phones. The search device determines that there are 10 regions according to the region attribute information of each of the 1,000 search results. That is, it determines region 1, region 2, region 3, region 4, region 5, region 6, region 7, region 8, region 9, and region 10. The number of search results under region 1 is 40;

the number of search results under region 2 is 40; the number of search results under region 3 is 450; the number of search results under region 4 is 10; the number of search results under region 5 is 200; the number of search results under region 6 is 20; the number of search results under region 7 is 10; the number of search results under region 8 is 150; the number of search results under region 9 is 30; the number of search results under region 10 is 50. The search device ranks these N regions from large-to-small order according to the search quantity under each of the 10 regions. That is, the ranking results are: region 3, region 5, region 8, region 10, region 1, region 2, region 9, region 6, region 4, and region 7. Then, the search device performs three matching operations. In the first matching, the search device uses the search keyword to conduct matching among the names of each of the 10 regions and obtains one region, namely region 8. In the second matching, the search device uses the search keyword to conduct matching among the business categories of each of the 10 regions to obtain five regions, namely region 5, region 10, region 2, region 6, and region 7. In the third matching, the search device uses the search category associated with the search keywords to conduct matching among the business categories of each of the 10 regions and obtains one region, namely region 3. Next, the search device can sequentially rank in the order that they were obtained the regions obtained through the first matching, the regions obtained through the second matching, and the regions obtained through the third matching. That is, the ranking results of the ranking are region 8, region 5, region 10, region 2, region 6, region 7, and region 3.

Next, the search device can use the location of the terminal on which the search device is located and the location of each of the seven determined regions to calculate the distance between the terminal and each region. In some embodiments, the search device uses the distances obtained thereby to adjust the ranking results and select the first M regions. There are many other ways to adjust the ranking results for the rankings. For example, it is possible to use the obtained distances and corresponding weights and the positions within the ranking results and the corresponding weights to re-rank the ranking results and obtain new ranking results, such as region 5, region 8, region 10, region 2, region 7, region 6, and region 3. Or, to give another example, it is possible to delete regions corresponding to distances outside of a preset distance threshold value so as to obtain those regions that ultimately need to be retained, such as region 8, region 5, region 10, region 6, region 7, and region 3. Thus, the first M regions selected by the search device can satisfy the region-based search intention of the user.

At 208, display information associated with the M regions is generated and caused to be displayed. For example, the display information is output to a client device which renders the display information. In various embodiments, the display information comprises but is not limited to one or more of the following forms of display: display form 1: textual information used to display the M regions; display form 2: graphic information used to display the M regions; and display form 3: geographic location information used to display the M regions.

In some embodiments, display form 1 (textual information) implements the existing approach of displaying search keyword-related supplemental keywords to the user and directly displaying the textual information of each of the M regions, e.g., displaying the names of regions.

In some embodiments, display form 2 displays graphic information for each of the M regions, such as photographs of the regions.

In some embodiments, display form 3 displays the geographic location information of each of the M regions. For example, on an electronic map, geographic identifiers for the corresponding geographic locations are displayed.

Thus, by incorporating the display forms described above, the textual information, graphical information, and/or geographic location information associated with the regions can be displayed. For example, on an electronic map, geographic identifiers for geographic locations corresponding to the geographic location information, as well as names and/or photographs, can be displayed.

Optionally, in some embodiments, the display information generated by the display device further includes, but is not limited to, at least one of the following forms of display: display form 4: a search box near which the M regions are displayed; and display form 5: a search results suggestion box near which the M regions are displayed.

In some embodiments, display form 4 displays the M regions in the form of a drop-down box under, above, to the left of, to the right of, or in any other appropriate direction relative to a search box. For example, if combination keywords comprising search keywords and search keyword-related supplemental keywords are also displayed in the form of a drop-down box under the search box, the M regions may be displayed under, above, to the left of, to the right of, or in any other appropriate direction relative to the combination keywords. Other appropriate user interface widgets such as pop-up windows can be used to display the M regions.

In some embodiments, display form 5 displays the M regions in the form of search results or promotional information near a search results recommendation box. For example, the M regions can be displayed under, above, to the left of, to the right of, or in any other appropriate direction relative to a search results suggestion box. The search results recommendation box is for displaying a plurality of search results matching the search keywords.

Any combination of the display forms described above can be implemented, and other forms of display can be used in other embodiments. For example, in display form 4, names, photographs, or geographic locations of the M regions can be specifically displayed in the form of a drop-down box under a search box. As another example, in display form 5, names, photographs, or geographic locations of the M regions can be specifically displayed in the form of search results under, to the left of, or to the right of a search box.

Let us take the search keywords "children's apparel" as an example. The search device receives the search keywords "children's apparel" entered by the user in the search box. The search engine uses the search keywords to conduct a search and acquire a plurality of search results matching the search keywords. The search device then determines six regions (the names of the six regions being Zhili Children's Apparel, Nantong Children's Apparel, Qingdao Children's Apparel, Hangzhou Children's Apparel, Beijing Children's Apparel, and Anhui Children's Apparel) based on the region attribute information of each of the plurality of search results. Thereafter, the search device can generate display information for the six regions according to a preset display strategy so that an application can display these six regions in accordance with the display information, as in the page diagram shown in FIG. 3. The M regions are displayed in the form of an electronic map using this page display layout.

That is, names, pictures, and marks are displayed on the electronic map at the geographic locations corresponding to the geographic location information of the M regions. The display provides a direct visual experience by displaying regions in which the search results are concentrated, i.e., how the search results are distributed with respect to the specialized markets. This makes it possible to quickly and accurately locate needed items in these specialized markets and thus increases search efficiency and accuracy. Moreover, because the selected M regions are those regions from which the most search results are found and the relative distances to the user's current location are the smallest, the user will be able to find better prices and pay less in shipping costs. In some embodiments, the user is permitted to directly select a region which causes a new search page (referred to as the sub-category search page) to be presented for the corresponding region. The user can conduct a further search in the sub-category search page to focus on a search for items with region attributes associated with the selected region.

In some embodiments, the search device optionally further receives information pertaining to a region selected by the user as a target region from the M regions. Then the search device uses the search keywords and the search target region to execute search operations.

For example, the user selects (e.g., clicks on) one of the M regions displayed by the application as the target region. In response, a page corresponding to the target region is displayed. As used herein a page refers to a HyperText Markup Language (HTML)-based web page. Examples of a page corresponding to the target region include a special catalog page listing only items from the selected region, a special search page permitting searches for items associated with the selected region only, etc. The search device then uses the search keywords and the target region to execute a search operation.

Or, to give another example, the user selects (for example, selects by performing a clicking operation) one of the M regions displayed by the application as the target region. The search keywords and the name of the target region appear in the search box. The search device then uses the search keywords and the name of the target region to execute a search operation.

There are many specific implementations for displaying M regions on a page according to the display information that are well known to those skilled in the art. An example is HTML Cascading Style Sheets (CSS). Other known techniques can be used.

In the present embodiment, the search device obtains a plurality of search results. The plurality of search results is obtained through matching based on search keywords entered by the user. Then M regions are determined according to the region attribute information of each of the plurality of search results. M is an integer greater than or equal to 1. Consequently, the search device can generate display information for the M regions and display the M regions according to the display information. The user can further refine the search by selecting a specific region. This technique solves a problem faced by existing techniques, namely the increase in data exchanges between applications and search engines as a result of users repeatedly using applications to conduct searches on the whole database. Thus, the processing load on search engines is reduced.

In addition, the technique employed by the present application can satisfy the true search intentions of users, e.g., a region-based intention such as conducting a precise search in search result distribution centers. This can effectively improve search effectiveness.

In addition, the technique employed by the present application can satisfy the true search intentions of users, e.g., a region-based intention such as conducting a precise search in search result distribution centers. This can effectively improve search precision.

In addition, the technique employed by the present application can satisfy the true search intentions of users, e.g., a region-based intention such as conducting a precise search in search result distribution centers. This can effectively improve search efficiency.

Figure 3:
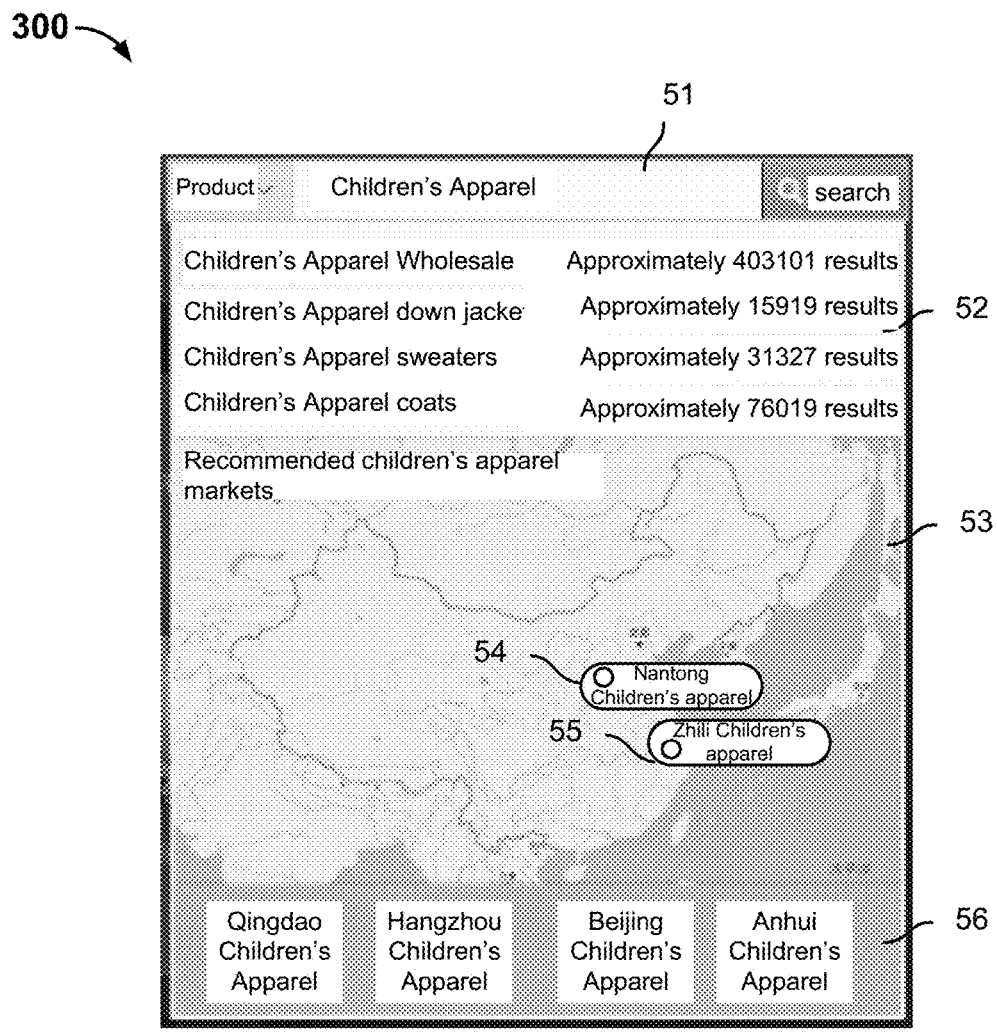
FIG. 3 is an example user interface screen illustrating a display of the search results.

FIG. 3 is an example user interface screen illustrating a display of the search results. User interface screen 300 can be displayed by a display device. The user interface screen includes a search box 51, a first recommendation display box 52, and a second recommendation display box 53. In particular, search box 51 is configured to receive the search keywords input by a user. First recommendation display box 52 is configured to display additional recommended search keywords associated with the original search keywords, and the approximate number of results that match the additional recommended search keywords.

Second recommendation display box 53 is configured to be displayed near the first recommendation display box 52. Second recommendation display box 53 includes a map interface, which displays a first geographic marker 54 associated with a first geographical location and a second geographic marker 55 associated with a second geographical location. The geographical locations are selected based at least in part on the user's geographic location information and regions associated with the search results. In this example, M=2 regions are selected and displayed in a map interface. Names of remaining regions that are not selected to be displayed in the map are shown in area 56 of the display. The user can perform further region specific searches by selecting (e.g., clicking on) a specific region name.

In some embodiments, the contents of the first recommendation display box and the second recommendation display box are synchronously updated and displayed following search operations performed on search keywords input into the search box 51.

In the present embodiment, by setting up a second recommendation display box, it is possible to display a first geographic marker and a second geographic marker on a map interface according to the user's geographic location information. Consequently, it is possible to display more pertinent search results closer to the current location of the user.

Figure 4:
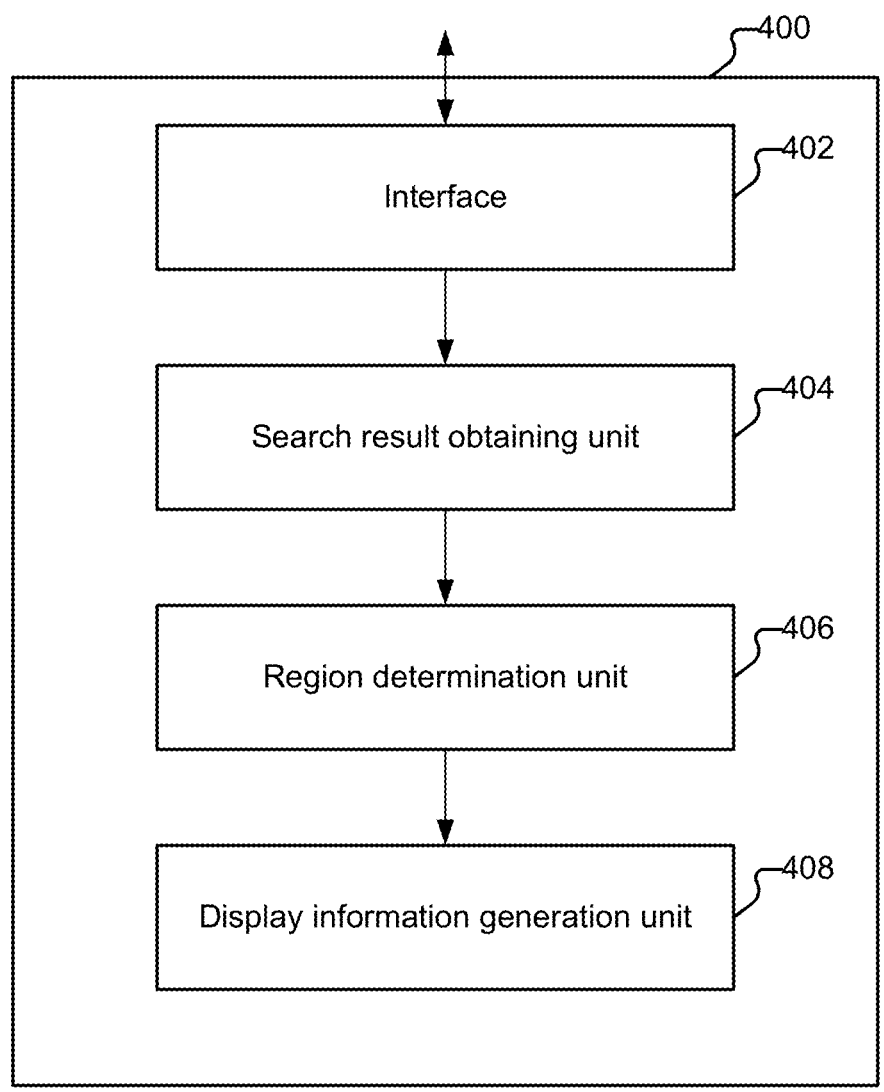
FIG. 4 is a structural diagram of an embodiment of a search device according to the present application.

FIG. 4 is a structural diagram of an embodiment of a search device according to the present application.

Some of the function modules in the search device provided by the present embodiment can be included in a search engine located in a server on the network side or an application located on a local client. They can also be implemented in a distributed system located on the network side.

In the example shown, search device 400 includes an interface 402, a search results obtaining unit 404, a region determination unit 406, and a display information generation unit 408. Details of the operations performed by the components of search device 400 are explained below, as well as in connection with process 200.

Interface 402 can be a communication interface such as a port, cable, wireline or wireless network interface card, etc., and internal connections such as a communication bus. It is configured to receive the set of search keywords input by the user from the client device.

Search result obtaining unit 404 is configured to obtain search results in response to the search keywords. In some embodiments, the plurality of search results is obtained by using the search keywords as indices and matching the search keywords with a database of indexed items.

Optionally, in some embodiments, search result obtaining unit 404 obtains in real time the search keywords input by a user in a search box. Specifically, with the search keywords being entered by the user into a search box, search result obtaining unit 404 acquires the search keywords in real time. Specifically, the search device specifically can use asynchronous loading technology such as Ajax async loading or Jsonp async loading to acquire the search keywords in real time and thus trigger search results obtaining unit 404, region determination unit 406, and display information generation unit 408 to execute their respective operations. The search device specifically can provide an Ajax interface or a Jsonp interface. Specifically, it can use a language such as Java or PHP for compiling, and Jquery can be used for specific invoking thereby. Or compiling can be done with a language such as primitive JavaScript.

In some embodiments, search results obtaining unit 404 is further configured to receive search instructions. The search instructions comprise the search words entered by a user in a search box. For example, the user enters the search keywords in the search box. Then the user clicks a button such as the "Search" button, which triggers a search instruction. The search instruction contains the search keywords.

In the present embodiment, the generating of search results is related to the search device.

For example, if the search device is a search engine in a network-side server or an application on the local terminal, the search device conducts a search according to the search keywords that were obtained so as to obtain the plurality of search results matched with the search keywords.

Or, to give another example, if the search device is a network-side distributed system, a search engine can first conduct a search based on the search keywords so as to obtain the plurality of search results matching the search keywords. Then it sends the plurality of search results to the search device.

Region determination unit 406 is configured to determine M regions according to the region attribute information of each of the plurality of search results, where M is an integer greater than or equal to 1.

In some embodiments, region determination unit 406 is configured to: determine N regions associated with the plurality of search results according to the region attribute information of each of the plurality of search results, wherein N is an integer greater than or equal to M; rank the N regions in large-to-small order according to the number of search results under each of the N regions; and adjust the ranking results of the ranking according to the location of the terminal on which it is located and the location of each of the N regions so as to select the first M regions.

Optionally, in some embodiments, region determination unit 406 is configured to determine M regions according to the region attribute information of each of the search results and the category attribute information of each of the search results.

Specifically, region determination unit 406 is configured to determine the search categories associated with the search keywords according to the category attribute information for each of the plurality of search results and determine P regions associated with the plurality of search results according to the region attribute information of each of the plurality of search results. P is an integer greater than or equal to M.

Furthermore, region determination unit 406 is configured to rank the P regions in large-to-small order according to the number of search results under each of the P regions.

Accordingly, in subsequent steps involving P regions, they are the P regions that have been ranked.

In some embodiments, region determination unit 406 is further configured to use the search keywords to conduct matching among the names of each of the P regions so as to obtain Q regions. Q is an integer greater than or equal to 0.

In some embodiments, region determination unit 406 is further configured to use the search keywords to conduct matching among the business categories of each of the P regions so as to obtain R regions. R is an integer greater than or equal to 0.

In some embodiments, region determination unit 406 is further configured to use the search categories associated with the search keywords to conduct matching among the business categories of each of the P regions so as to obtain S regions. S is an integer greater than or equal to 0.

Region determination unit 406 is further configured to sequentially rank the Q regions, the R regions, and the S regions according to the order in which they were obtained. That is, the Q regions are ranked in the top positions; the R regions are ranked in the middle positions; and the S regions are ranked in the last positions.

Lastly, region determination unit 406 is configured to adjust the ranking results of the ranking according to the location of the terminal, the location of each of the Q regions, the location of each of the R regions, and the location of each of the S regions, and select the first M regions.

Display information generation unit 408 is configured to generate display information for the M regions. In various embodiments, the display information comprises at least one of the following forms of display: display form 1: textual information used to display the M regions; display form 2: graphic information used to display the M regions; and display form 3: geographic location information used to display the M regions.

Optionally, in some embodiments, the display information generated by the display device further includes, but is not limited to, at least one of the following forms of display: display form 4: a search box near which the M regions are displayed; and display form 5: a search results suggestion box near which the M regions are displayed.

The M regions may be displayed using any of the five forms of display described above or a combination of any number of the five forms of display described above. The present embodiment imposes no special restrictions in this regard.

Figure 5:
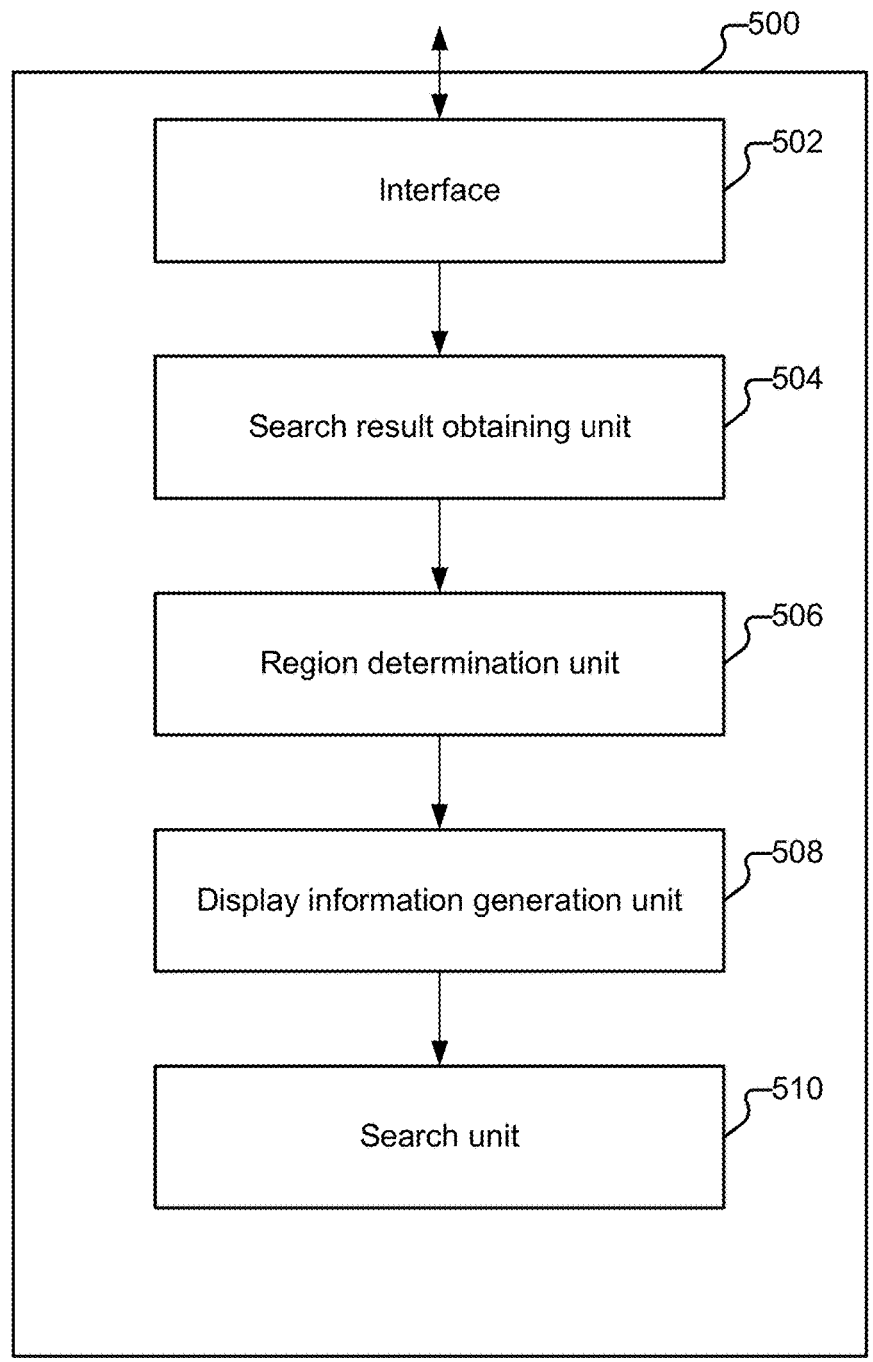
FIG. 5 is another embodiment of a search device according to the present application.

FIG. 5 is another embodiment of a search device according to the present application. Device 500 includes an interface 502, a search result obtaining unit 504, a region determination unit 506, a display information generation unit 508, and a search unit 510. The operations of 502-508 are similar to those of 402-408 described above. Details of the operations performed by the components of search device 500 are explained below, as well as in connection with process 200 of FIG. 2. Search unit 510 is configured to acquire a region selected as the target region by the user from the M regions and use the search keywords and the target region to execute a search operation.

In some embodiments, search unit 510 is configured to present a page corresponding to the target region and use the search keywords and the search target region to execute search operations.

In some embodiments, search unit 510 is configured to show keywords and the name of the target region in a search box and use the search keywords and the search target region to execute search operations.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-units.

Figure 6:
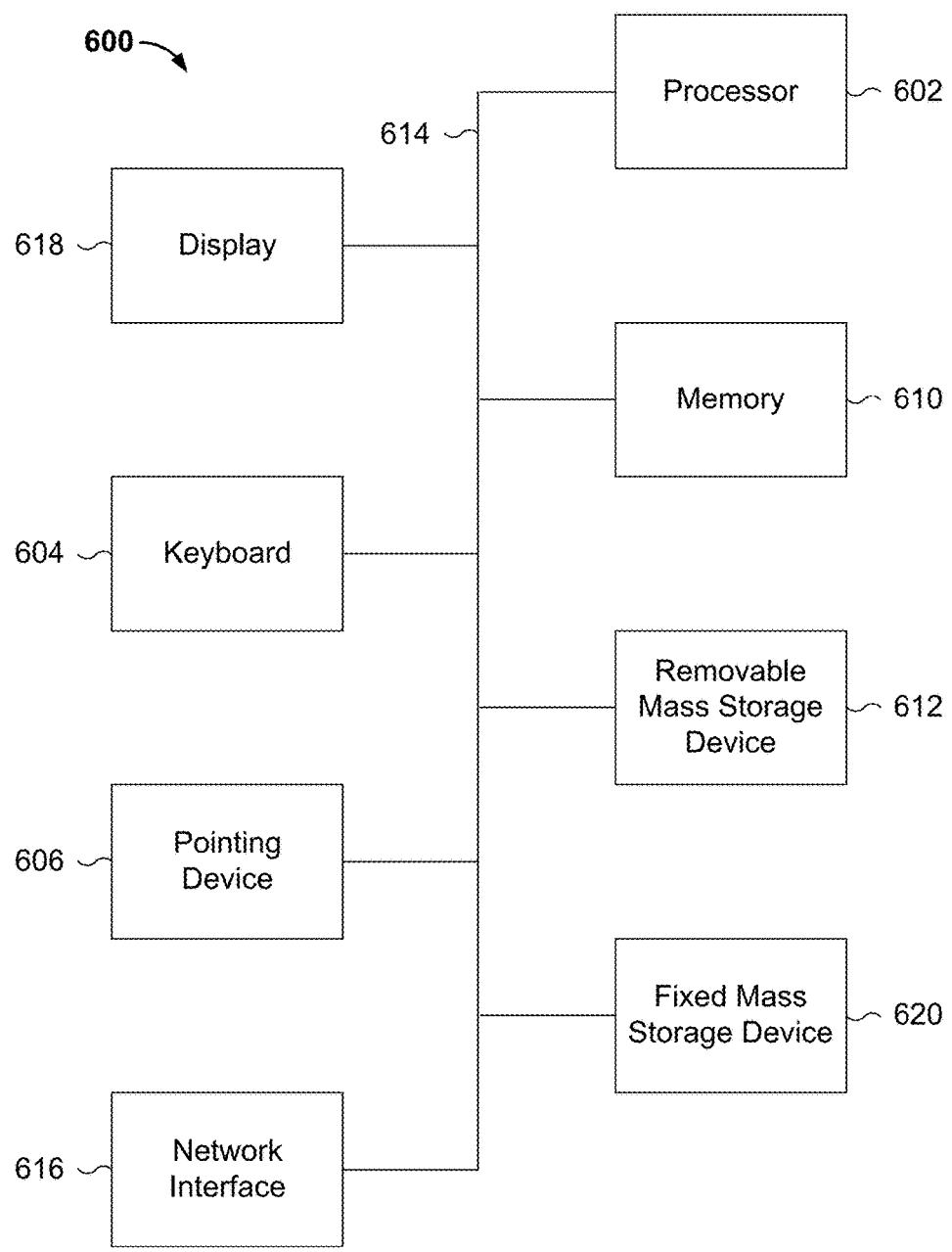
FIG. 6 is a functional diagram illustrating a programmed computer system for performing region-based searches in accordance with some embodiments.

FIG. 6 is a functional diagram illustrating a programmed computer system for performing region-based searches in accordance with some embodiments. As will be apparent, other computer system architectures and configurations can be used to perform region-based searches. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide region-based search results.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a set of one or more search keywords configured to search for goods or services, the set of one or more search keywords not specifying location information;
    obtaining a plurality of search results that are generated in response to a search performed using the set of one or more search keywords, the plurality of search results each having corresponding region attribute information determined based on geographic information of the goods or services that are found to match the search, the region attribute information pertaining to non-overlapping regions;
    establishing a plurality of regions according to at least region attribute information of the plurality of search results, wherein:
        the plurality of regions comprises M regions, M being an integer greater than 1;
        the plurality of regions is associated with the set of one or more search keywords; and
        the establishing of the plurality of regions comprises:
            determining a set of N regions associated with the plurality of search results, N being an integer greater than or equal to M;
            ranking the set of N regions according to a number of search results under each of the set of N regions;
            obtaining a set of distances from a location of a terminal from which the set of one or more search keywords is entered to corresponding locations of the set of N regions; and
            adjusting ranking results of the set of N regions based at least in part on the set of distances to select the M regions as first M regions based on the adjusted ranking results;
        and wherein the plurality of search results each further has a corresponding category attribute information, and the plurality of regions is established further according to the category attribute information of the plurality of the search results, wherein:
            the plurality of regions comprises M regions, M being an integer greater than or equal to 1; and
            establishing the plurality of regions further comprises:
                determining a set of one or more search categories associated with the set of one or more search keywords according to the category attribute information of respective ones of the plurality of search results;
                determining P regions associated with the plurality of search results according to the region attribute information of each of the plurality of search results, P being an integer greater than or equal to M, and the P regions determined have corresponding names and business categories;
                using the search keywords to match among the names of the P regions to obtain Q regions, Q being an integer greater than or equal to 0;
                using the search keywords to match among the business categories of the P regions to obtain R regions, R being an integer greater than or equal to 0;
                using the search categories associated with the search keywords to match among the business categories of each of the P regions to obtain S regions, S being an integer greater than or equal to 0; ranking the Q regions, the R regions, and the S regions according to an order in which they were obtained; and
                adjusting ranking results of the ranking according to a location of a terminal from which the set of one or more search keywords is entered, corresponding locations of the Q regions, corresponding locations of the R regions, and corresponding locations of the S regions to select the M regions;
    generating display information associated with the plurality of regions, the display information comprising one or more of: textual information, graphic information, or geographical location information; and
    causing the display information to be displayed.

2. The method of claim 1, further comprising: causing the textual information, the graphic information, or both, to be displayed in the plurality of regions on an electronic map.

3. The method of claim 1, further comprising: causing to be displayed a plurality of markers corresponding to the plurality of regions on an electronic map, based at least in part on a plurality of geographic locations corresponding to the geographic location information of the plurality of regions.

4. The method of claim 1, wherein the display information further comprises one or more of: a search box near which the plurality of regions are displayed; or a search results suggestion box near which the plurality of regions are displayed.

5. The method of claim 1, further comprising: obtaining information pertaining to a search target region selected by a user among M regions; and using the search keywords and the search target region to execute search operations.

6. The method of claim 5, wherein using the search keywords and the search target region to execute search operations comprises: displaying a page corresponding to the search target region and using the search keywords and the search target region to execute search operations in the page; or displaying the search keywords and a name of the search target region and using the search keywords and the search target region to execute search operations.

7. The method of claim 1, wherein the display information is displayed for each of the plurality of regions.

8. The method of claim 1, further comprising: ranking the plurality of regions according to a number of search results under each of the plurality of regions.

9. The method of claim 8, wherein: the display information pertaining to a first set of one or more regions of the plurality of regions is displayed in a first area of a display; the display information pertaining to a second set of one or more regions of the plurality of regions is displayed in a second area of the display; and the first set of one or more regions is ranked higher than the second set of one or more regions.

10. The method of claim 1, wherein the geographic information of the goods or services pertains to places of origin of the goods or services.

11. A system comprising:
one or more processors configured to:
receive a set of one or more search keywords configured to search for goods or services, the set of one or more search keywords not specifying location information;
receive a plurality of search results that are generated in response to a search performed using the set of one or more search keywords, the plurality of search results each having corresponding region attribute information determined based on geographic information of the goods or services that are found to match the search, the region attribute information pertaining to non-overlapping regions;
establish a plurality of regions according to at least region attribute information of the plurality of search results, wherein:
the plurality of regions comprises M regions, M being an integer greater than 1;
the plurality of regions is associated with the set of one or more search keywords; and
to establish the plurality of regions comprises to:
determine a set of N regions associated with the plurality of search results, N being an integer greater than or equal to M;
rank the set of N regions according to a number of search results under each of the set of N regions;
obtain a set of distances from a location of a terminal from which the set of one or more search keywords is entered to corresponding locations of the set of N regions; and
adjust ranking results of the set of N regions based at least in part on the set of distances to select the M regions as first M regions based on the adjusted ranking results;
and wherein the plurality of search results each further has a corresponding category attribute information, and the plurality of regions is established further according to the category attribute information of the plurality of the search results, wherein:
the plurality of regions comprises M regions, M being an integer greater than or equal to 1; and
to establish the plurality of regions further comprises:
determine a set of one or more search categories associated with the set of one or more search keywords according to the category attribute information of respective ones of the plurality of search results;
determine P regions associated with the plurality of search results according to the region attribute information of each of the plurality of search results, P being an integer greater than or equal to M, and the P regions determined have corresponding names and business categories;
use the search keywords to match among the names of the P regions to obtain Q regions, Q being an integer greater than or equal to 0;
use the search keywords to match among the business categories of the P regions to obtain R regions, R being an integer greater than or equal to 0;
use the search categories associated with the search keywords to match among the business categories of each of the P regions to obtain S regions, S being an integer greater than or equal to 0; ranking the Q regions, the R regions, and the S regions according to an order in which they were obtained; and
adjust ranking results of the ranking according to a location of a terminal from which the set of one or more search keywords is entered, corresponding locations of the Q regions, corresponding locations of the R regions, and corresponding locations of the S regions to select the M regions;
generate display information associated with the plurality of regions, the display information comprising one or more of: textual information, graphic information, or geographical location information; and
cause the display information to be displayed; and one or more memories coupled to the one or more processors, configured to provide the one or more processors with instructions.

12. The system of claim 11, wherein the one or more processors are further configured to: cause the textual information, the graphic information, or both, to be displayed in the plurality of regions on an electronic map.

13. The system of claim 11, wherein the one or more processors are further configured to: cause to be displayed a set of one or more markers corresponding to the plurality of regions on an electronic map, based at least in part on a plurality of geographic locations corresponding to the geographic location information of the plurality of regions.

14. The system of claim 11, wherein the display information further comprises one or more of: a search box near which the plurality of regions are displayed; or a search results suggestion box near which the plurality of regions are displayed.

15. The system of claim 11, wherein the one or more processors are further configured to: obtain information pertaining to a search target region selected by a user among M regions; and use the search keywords and the search target region to execute search operations.

16. The system of claim 15, wherein to use the search keywords and the search target region to execute search operations comprises to:
display a page corresponding to the search target region and use the search keywords and the search target region to execute search operations in the page; or display the search keywords and a name of the search target region and use the search keywords and the search target region to execute search operations.

17. A computer program product, the computer program product being embodied in a tangible non-transitory computer readable storage medium and comprising computer instructions for:
receiving a set of one or more search keywords configured to search for goods or services, the set of one or more search keywords not specifying location information;
obtaining a plurality of search results that are generated in response to a search performed using the set of one or more search keywords, the plurality of search results each having corresponding region attribute information determined based on geographic information of the goods or services that are found to match the search, the region attribute information pertaining to non-overlapping regions;
establishing a plurality of regions according to at least region attribute information of the plurality of search results, wherein:

the plurality of regions comprises M regions, M being an integer greater than 1;

the plurality of regions is associated with the set of one or more search keywords; and the establishing of the plurality of regions comprises:
- determining a set of N regions associated with the plurality of search results, N being an integer greater than or equal to M;
- ranking the set of N regions according to a number of search results under each of the set of N regions;
- obtaining a set of distances from a location of a terminal from which the set of one or more search keywords is entered to corresponding locations of the set of N regions; and
- adjusting ranking results of the set of N regions based at least in part on the set of distances to select the M regions as first M regions based on the adjusted ranking results;

and wherein the plurality of search results each further has a corresponding category attribute information, and the plurality of regions is established further according to the category attribute information of the plurality of the search results, wherein:

the plurality of regions comprises M regions, M being an integer greater than or equal to 1; and establishing the plurality of regions further comprises:
- determining a set of one or more search categories associated with the set of one or more search keywords according to the category attribute information of respective ones of the plurality of search results;
- determining P regions associated with the plurality of search results according to the region attribute information of each of the plurality of search results, P being an integer greater than or equal to M, and the P regions determined have corresponding names and business categories;
- using the search keywords to match among the names of the P regions to obtain Q regions, Q being an integer greater than or equal to 0;
- using the search keywords to match among the business categories of the P regions to obtain R regions, R being an integer greater than or equal to 0;
- using the search categories associated with the search keywords to match among the business categories of each of the P regions to obtain S regions, S being an integer greater than or equal to 0; ranking the Q regions, the R regions, and the S regions according to an order in which they were obtained; and
- adjusting ranking results of the ranking according to a location of a terminal from which the set of one or more search keywords is entered, corresponding locations of the Q regions, corresponding locations of the R regions, and corresponding locations of the S regions to select the M regions;

generating display information associated with the plurality of regions, the display information comprising one or more of: textual information, graphic information, or geographical location information; and causing the display information to be displayed.

* * * * *